(12) United States Patent  (10) Patent No.: US 9,272,923 B2
Lipke et al.  (45) Date of Patent: Mar. 1, 2016

(54) SHAPED METAL-CONTAINING COMPONENTS AND REACTION BASED METHODS FOR MANUFACTURING THE SAME

(75) Inventors: David W. Lipke, Lancaster, CA (US); Kenneth H. Sandhage, Roswell, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 782 days.

(21) Appl. No.: 13/576,437

(22) PCT Filed: Feb. 1, 2011

(86) PCT No.: PCT/US2011/023396
§ 371 (c)(1),
(2), (4) Date: Aug. 1, 2012

(87) PCT Pub. No.: WO2011/094756
PCT Pub. Date: Aug. 4, 2011

(65) Prior Publication Data
US 2012/0295783 A1 Nov. 22, 2012

Related U.S. Application Data

(60) Provisional application No. 61/300,164, filed on Feb. 1, 2010.

(51) Int. Cl.
*C01B 11/00* (2006.01)
*C01B 31/00* (2006.01)
*C01B 35/00* (2006.01)
*C01G 37/00* (2006.01)
*C01G 39/00* (2006.01)
*C01G 41/00* (2006.01)
(Continued)

(52) U.S. Cl.
CPC ............... *C01G 35/00* (2013.01); *C01G 33/00* (2013.01); *C01G 39/00* (2013.01); *C01G 41/00* (2013.01); *C01P 2002/72* (2013.01); *C01P 2004/03* (2013.01)

(58) Field of Classification Search
None
See application file for complete search history.

(56) References Cited

U.S. PATENT DOCUMENTS 855,060 A   5/1907  Just et al.
3,443,301 A * 5/1969 Galasso et al. ............... 228/178
(Continued)

OTHER PUBLICATIONS

Tagstrom et al(Atomic Layer Epitaxy of Tungsten Oxide Films Using Oxyfluorides as Metal Precursors, J Elec Soc, (1999), 146 (8) 3139-3143).*
(Continued)

*Primary Examiner* — Melvin C Mayes
*Assistant Examiner* — Michael Forrest
(74) *Attorney, Agent, or Firm* — Troutman Sanders LLP; Ryan A. Schneider; Troy S. Kleckley (57) ABSTRACT

Methods of converting shaped templates into shaped metal-containing components, allowing for the production of free-standing, porous metal-containing replicas whose shapes and microstructures are derived from a shaped template, and partially or fully converting the shaped templates to produce metal-containing coatings on an underlying shaped template are described herein. Such coatings and replicas can be applied in a variety of fields including, but not limited to, catalysis, energy storage and conversion, and various structural or refractory materials and structural or refractory composite materials.

30 Claims, 9 Drawing Sheets

(51) Int. Cl.
     *C22B 34/30*    (2006.01)
     *C01G 31/00*    (2006.01)
     *C01G 33/00*    (2006.01)
     *C01G 35/00*    (2006.01)
     *C22B 34/20*    (2006.01)

(56) References Cited

U.S. PATENT DOCUMENTS 3,644,088 A * 2/1972 Bryson et al. ............... 423/472
3,846,527 A    11/1974 Winter et al.
4,462,970 A    7/1984  Pastor et al.
5,965,055 A    10/1999 Hung
6,194,650 B1 * 2/2001 Wakayama et al. ........... 136/256
7,008,695 B1   3/2006  Clough

OTHER PUBLICATIONS

International Search Report and Written Opinion dated Apr. 27, 2011 for related PCT Patent Application No. PCT/US2011/023396.

* cited by examiner

SHAPED METAL-CONTAINING COMPONENTS AND REACTION BASED METHODS FOR MANUFACTURING THE SAME

CROSS-REFERENCE TO RELATED APPLICATIONS

This application claims the benefit of International Patent Application Serial No. PCT/US2011/023396, filed 1 Feb. 2011, which claims the benefit of U.S. Provisional Patent Application Ser. No. 61/300,164, filed 1 Feb. 2010, which are incorporated herein by reference in their entirety as if fully set forth below.

STATEMENT REGARDING FEDERALLY SPONSORED RESEARCH

This invention was made with United States Government support under Agreement No. FA9550-07-1-0115, awarded by the United States Air Force. Accordingly, the United States Government has certain rights in this invention.

BACKGROUND

1. Field

The various embodiments of the present invention relate to the syntheses of shaped metal-containing components, and more particularly to methods that at least partially convert shaped templates into metal-containing components that retain the shape and microstructure of the template.

2. Description of Related Art

Carbon is used in a wide variety of applications because of its high-temperature strength, relatively low density, relatively low cost, machinability, and attainable macroscale-to-microscale-to-nanoscale structures. Carbon is readily available as graphite particles, discontinuous and continuous fibers, graphitic and amorphous foams, and combinations thereof, all of which may be shaped into any number of complex three-dimensional patterns. As such, engineered carbon materials can be versatile and robust substrates for conversion into metal and metal carbide ceramic coatings or replicas.

Metal and metal carbide coatings have been applied to carbon fibers and other carbon-based substrates using a variety of approaches. By way of example, one such approach utilizes chemical vapor deposition techniques with metal halide gases and hydrogen gas (as the reducing agent) to form a metal coating, and/or a hydrocarbon gas as the carbon source to form a metal carbide coating, and/or a substrate as the carbon source to form a metal carbide coating. These existing methods, and/or the gases used in these existing methods, can be expensive. The gases used in these existing methods can also be difficult to handle. Furthermore, these existing methods require an external gaseous or liquid reducing agent (that is, a reducing agent other than the carbon substrate) to drive the overall reaction.

BRIEF SUMMARY

Various embodiments of the present invention provide a method of manufacturing of a metal-containing component by reacting a metal oxyhalide fluid with a shaped template to form a shaped metal-containing component. No external reducing agents (such as a reducing gas or liquid) are used to facilitate this reaction. The metal oxyhalide fluid can be a vapor.

The method can further comprise reacting a metal halide salt with a first metal oxide to form a second metal oxide and the metal oxyhalide fluid. The metal oxyhalide fluid can be formed according to the following formula:

wherein $a=v/(y-u)$, $RX_q$ is the metal halide salt, $MO_y$ is the first metal oxide, $R_{a/q}MO_{1+y}$ is the second metal oxide, $MO_uX_v$ is the metal oxyhalide fluid, and the parameters a, q, u, v, and y can be integers or fractions of integers.

The metal halide salt can be an alkaline earth metal halide salt. In other embodiments, the metal halide salt can be an alkali metal halide salt. In another example, the metal halide salt can be a transition metal halide salt. The first metal oxide can be a transition metal oxide. The transition metal in the transition metal oxide can be tungsten. In other embodiments, the transition metal in the transition metal oxide can be molybdenum. In other examples, the transition metal in the transition metal oxide can be niobium. In another example, the transition metal in the transition metal oxide can be tantalum.

In some examples, the metal in the metal oxyhalide fluid can be tungsten. In other examples, the metal in the metal oxyhalide fluid can be molybdenum. In yet other examples, the metal in the metal oxyhalide fluid can be niobium. Further, the metal in the metal oxyhalide fluid can be tantalum.

Additionally, in some embodiments, the halogen in the metal oxyhalide fluid can be fluorine. In other examples, the halogen in the metal oxyhalide fluid can be chlorine.

In some embodiments, the shaped template is a shaped carbon template. The carbon template can be formed from a carbon fiber. In other embodiments, the shaped template can be a shaped boron template.

In some embodiments, the shaped metal-containing component comprises a shaped metal. In other embodiments, the shaped metal-containing component comprises a shaped metal carbide. In still other embodiments, the shaped metal-containing component comprises a shaped metal boride.

The method can further comprise at least partially reacting the shaped template. Further, the shaped metal-containing component can be a replica of the shaped template. Further, the replica can be substantially identical in configuration to the shaped template. Additionally, the shaped metal-containing component can be a coating disposed over the shaped template.

In some embodiments, the shaped metal-containing component is formed according to the following formula:

wherein C is a shaped carbon template, $MO_uX_v$ and $MO_yX_z$ are metal oxyhalide fluids, M is the shaped metal-containing component, $CO_r$ is a carbon oxide (such as carbon monoxide or carbon dioxide), $v=dz$, $u=dy+br$, and the parameters u, v, y, and z can be integers or fractions of integers.

In other embodiments, the shaped metal-containing component is formed according to the following formula:

wherein C is a shaped carbon template, $MO_uX_v$ and $MO_yX_z$ are metal oxyhalide fluids, MC is the shaped metal-containing component, $CO_r$ is a carbon oxide (such as carbon monoxide or carbon dioxide), $v=dz$, $u=dy+br$, and the parameters s, u, v, y, and z can be integers or fractions of integers.

Other embodiments provide a method of manufacturing a shaped metal-containing component by reacting a first metal oxyhalide fluid and a second metal oxyhalide fluid alternatingly and sequentially with a shaped template to form a shaped multilayered metal-containing component. No reducing agents other than the shaped template are used to facilitate the reaction. The first metal oxyhalide fluid and/or the second metal oxyhalide fluid can be a vapor. The shaped multilayered metal-containing component can then be heated to form a shaped metal-containing alloy component.

Alternative embodiments provide a method of manufacturing a shaped metal-containing component by reacting a first metal oxyhalide fluid and a second metal oxyhalide fluid simultaneously with a shaped template to form a metal-containing alloy component. No reducing agents other than the shaped template are used to facilitate the reaction. The first metal oxyhalide fluid and/or the second metal oxyhalide fluid can be a vapor.

Other embodiments provide a method of manufacturing a metal-containing component by reacting a first metal oxyhalide vapor and a second metal oxyhalide vapor alternatingly and sequentially or simultaneously with a shaped template to form a metal-containing component comprising metal and ceramic components. No external reducing agents are used to facilitate this reaction. The first metal oxyhalide fluid and/or the second metal oxyhalide fluid can be a vapor.

In some embodiments, the ceramic component comprises metal carbide. In other embodiments, the ceramic component comprises metal boride.

Further embodiments provide a method of manufacturing a metal-containing component by reacting at least two metal oxyhalide vapors with a shaped template to form a metal-containing component comprising metal alloy and ceramic components. No external reducing agents are used to facilitate this reaction. The first metal oxyhalide fluid and/or the second metal oxyhalide fluid can be a vapor.

In some embodiments, the ceramic component comprises metal carbide. In other embodiments, the ceramic component comprises metal boride.

The foregoing summarizes only a few aspects of the present invention and is not intended to be reflective of the full scope of the present invention as claimed. Additional features and advantages of the present invention are set forth in the following description, may be apparent from the description, or may be learned by practicing the present invention. Moreover, both the foregoing summary and following detailed description are exemplary and explanatory and are intended to provide further explanation of the present invention as claimed.

DETAILED DESCRIPTION

Referring now to the figures, wherein like reference numerals represent like parts throughout the several views, exemplary embodiments of the present invention will be described in detail. Throughout this description, various components can be identified as having specific values or parameters, however, these items are provided as exemplary embodiments. Indeed, the exemplary embodiments do not limit the various aspects and concepts of the present invention as many comparable parameters, sizes, ranges, and/or values can be implemented It should also be noted that, as used in the specification and the appended claims, the singular forms "a," "an," and "the" include plural references unless the context clearly dictates otherwise. For example, reference to a component is intended also to include composition of a plurality of components. References to a composition containing "a" constituent is intended to include other constituents in addition to the one named. Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Values may be expressed herein as "about" or "approximately" one particular value, this is meant to encompass the one particular value and other values that are relatively close but not equal to the one particular value. By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

Disclosed herein are methods of forming metal-containing coatings over a shaped template or shaped metal-containing replicas from shaped templates, collectively referred to as "metal-containing components." It shall be understood that the term "metal-containing" can mean any composition that contains a metal either in elemental or ionic form, such as metal elements, metal solid solutions, metal mixtures, metal carbides, metal carbide solid solutions, metal carbide mixtures, metal borides, metal boride solid solutions, metal boride mixtures, and/or combinations thereof. These methods can allow for the production of freestanding, porous or fully-dense metal-containing components whose shapes and microstructures are derived from the template. These methods can involve partially or fully converting the template to produce metal-containing coatings on the underlying template or metal-containing replicas of the template, respectively. Such coatings and replicas can be applied in a variety of fields including, but not limited to, catalysis, energy storage and conversion, and various structural or refractory materials and various structural or refractory composite materials.

Generally, the shaped metal-containing coating or replica can be formed by reacting a metal oxyhalide fluid with a solid shaped template to produce a metal-containing component that retains the shape and microstructure of the template. As used herein, the term "fluid" encompasses vapors, liquids, plasmas, aerosols, and the like. Unlike other reactions, this reaction does not require any external reducing agents (e.g., hydrogen and hydrocarbon gas) other than the shaped template to facilitate the reaction.

In an exemplary process, a shaped template is first provided. The shaped template can be formed partially or entirely from carbon. Any suitable form of carbon (e.g., graphite, graphene sheets, diamond, diamond-like carbon, carbon nanotubes, and the like) can be used. The shaped template can be fully dense, or it can be at least partially porous. Thus, for example, the shaped carbon template can be in the form of graphite particles; discontinuous and/or continuous carbon fibers or tubes; carbon films or coatings; graphitic, diamond, and/or amorphous foams; or the like, or a combination thereof, all of which can be further shaped into many configurations. The shaped template can also be formed partially or entirely from boron. Similarly, the shaped boron template can take a variety of forms and/or configurations.

Next, a metal oxyhalide fluid is provided. The metal oxyhalide fluid may be a vapor, a liquid, a plasma, or an aerosol. The metal oxyhalide fluid can be produced by reacting a metal halide salt with a transition metal oxide to form a reactive metal oxyhalide fluid via the overall reaction:

$$(v/q)RX_q + (1+v/a)MO_y = (v/a)R_{a/q}MO_{1+y} + MO_uX_v$$

wherein $a = v/(y-u)$, and the parameters a, y, q, u, and v can be integers or fractions of integers. In this reaction, R is a metal, and more specifically, can be an alkaline earth metal, an alkali metal, or a transition metal. X is a halogen, and more specifically, can be fluorine or chlorine. $MO_y$ is a metal oxide, wherein M can be a transition metal. More specifically, M can be tungsten, molybdenum, niobium, tantalum, and the like. One exemplary reaction is:

$$CaCl_2 + 2WO_3 = CaWO_4 + WO_2Cl_2(g),$$

wherein $WO_2Cl_2$ is the metal oxyhalide vapor to be used in the second reaction (i.e., the metal-containing component providing reaction) with carbon, described below.

This reaction is beneficial because the precursor materials, i.e., the metal halide salt and transition metal oxide, are relatively inexpensive, relatively insensitive to oxygen at or below 1 atmosphere pressure, and non-volatile. Second, owing to the thermodynamic favorability of the reaction, the synthesis can be conducted at moderate temperatures, for example, below approximately 1000 degrees Celsius (° C.). Third, the process enables a high yield of metal oxyhalide vapor and thus does not generate significant by-products that would need to be separated via distillation or other costly separation procedures. Lastly, the process eliminates the need for direct fluorination or chlorination of the metal-containing precursors, which would otherwise be corrosive, toxic, and require specialized processing equipment for separation and disposal of unreacted fluorine or chlorine vapors. Further, such unreacted fluorine or chlorine vapors could react with metallic-element containing phases, thus resulting in etching and destruction of the coating or replica. The metal oxyhalide fluid can be used in the reaction that produces the metal-containing replica or coating from the template.

Hereinbelow, the various embodiments of the reaction that produces the metal-containing coating or replica will be described with reference to carbon as the template. It will be understood, however, that other templates can be equally applicable in the process. It will also be understood, that when reference is made to a "replica," such reference can also apply to coatings. It shall also be understood that the term "metal-containing" can mean any composition that contains a metal either in elemental or ionic form, such as metal elements, metal solid solutions, metal mixtures, metal carbides, metal carbide solid solutions, metal carbide mixtures, metal borides, metal boride solid solutions, metal boride mixtures, and/or combinations thereof.

The processes and parameters described below are equally applicable to any of the aforementioned templates without having to depart from the details and parameters provided below. Thus, for example, when reference is made to the reaction between a metal oxyhalide fluid and a carbon template to produce a metal or a metal carbide replica, it will be equally understood that such reference can also apply to a reaction between a metal oxyhalide fluid and a boron template to produce a metal or a metal boride replica. One skilled in the art will also understand that certain reaction conditions, for example, temperature and reaction time, are dependent upon the particular type of metal oxyhalide fluid and template reactants that are used.

Exemplary reactions utilize a shape-preserving reaction technique, in which a porous carbon template (and, as explained in the paragraph above, any other template composition described) undergoes a reaction with the metal oxyhalide fluid to produce either a porous metal replica or a metal carbide replica of the carbon template. This gas-solid displacement reaction can be used to partially or completely convert thick, for example, greater than 1 millimeter (mm), carbon templates into freestanding, monolithic porous metal or metal carbide replicas. The reactions can be generally summarized as:

$$bC + MO_uX_v = (1-d)M + dMO_yX_z + bCO_r;\text{ and}$$

$$(b+s(1-d))C + MO_uX_v = (1-d)MC_s + dMO_yX_z + bCO_r.$$

wherein M is a metal and X is a halogen, and further wherein $v = dz$ and $u = dy + br$ and the parameters s, u, v, y, and z may be integers or fractions of integers. Again, as understood by one skilled in the art, the coefficients for each reactant will vary based on the oxidation state of M and the template material. In exemplary embodiments of the present invention, the metal is a transition metal, and more specifically, tungsten, molybdenum, niobium, tantalum, or the like. Further, the halogen can be fluorine or chlorine. An exemplary reaction is:

$$4C+3WO_2Cl_2(g)=W+4CO(g)+2WOCl_3(g).$$

Another exemplary reaction is:

$$7C+5TaOCl_3(g)=2TaC+3TaCl_5(g)+5CO(g)$$

where TaC is a stoichiometric line-compound carbide. Another exemplary reaction is:

$$6C+5TaOCl_3(g)=2TaC_{0.5}+3TaCl_5(g)+5CO(g)$$

where $TaC_{0.5}$ can represent either the reduced form of $Ta_2C$ or the sub-stoichiometric carbide $TaC_{(1-0.5)}$ where half the carbon atoms have been replaced by vacancies.

Because of carbon's structural and chemical stability properties, the reaction between the carbon template and the metal oxyhalide can occur at relatively high temperatures. Such high temperatures help to drive the reaction because it assists carbon in selectively reacting with the oxygen present in the reaction.

As stated above, this reaction does not require hydrogen gas to act as the reducing agent. Rather, the carbon template serves as a consumable reducing agent for the metal oxyhalide fluid, resulting in a self-limiting process that allows for uniform conversion throughout the carbon template. Generated porosity may be the result of the often negative change in solid molar volume that can occur upon conversion of the solid reactant or reactants (e.g., carbon) into the solid product or solid products (e.g., metal and metal carbide). This generated porosity is beneficial because it can allow for the inward migration of the reactant species, specifically the metal oxyhalide fluid, therefore causing the reaction front to proceed inwards from the exterior surface of the carbon template. Further, this generation of internal porosity can allow for the conversion of the carbon template to a metal or metal carbide replica with minimal detectable changes in exterior shape or dimension of the template. As an example, the changes in exterior shape or dimension of the template can be less than approximately 1.5% in linear dimension. For other carbon template geometries, however, a relatively dense, coherent product layer can form on the underlying carbon which inhibits migration of fluid species. In this particular case, carbon may diffuse outward, and an internally generated cavity can form and grow from the interior of the carbon template rather than within the product layer growing inward from the exterior surface.

Temperatures and/or reaction times spanning a wide range may be used to facilitate the reaction between the metal oxyhalide fluid and the carbon template. It is understood, however, that the reaction should not be conducted at the decomposition temperatures of the reactants. It is also understood that the reaction time is dependent upon the desired level of reaction completion. It is further understood that reaction temperature and reaction time are interrelated in that an increase in temperature may necessitate a decrease in reaction time, and similarly a decrease in temperature may necessitate an increase in reaction time. For example, the reaction between the metal oxyhalide fluid and the carbon template can occur at a reaction temperature range between approximately 700° C. and 1500° C., as many metals have limited volatilities within that range. As examples, tungsten and molybdenum have limited volatilities at this reaction temperature range and, as stated above, can be used in exemplary embodiments of the reaction. Again, it shall be understood that the reaction between the metal oxyhalide fluid and the carbon template can occur at temperatures less than 700° C. and greater than 1500° C. For the successful completion of the reaction, the metal oxyhalide fluid should be in contact with the carbon template for a sufficient amount of time to allow for the desired extent of conversion to occur, as the reaction can either partially or completely convert the carbon template. This reaction can be carried out in an open-flow system using an inert carrier gas (e.g., argon). Alternatively, the reaction can be carried out in a closed-system.

Figure 1:
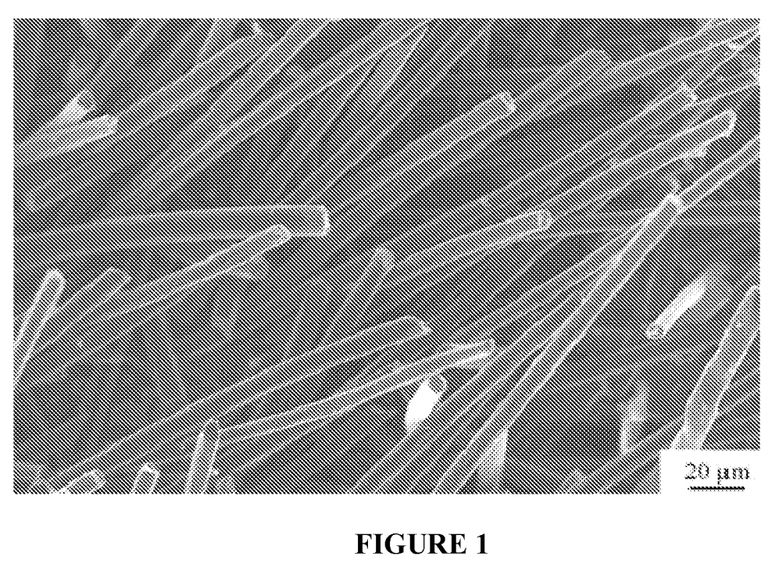
FIG. 1 is a scanning electron microscope (SEM) image of carbon fibers in accordance with exemplary embodiments of the present invention.
Figure 2:
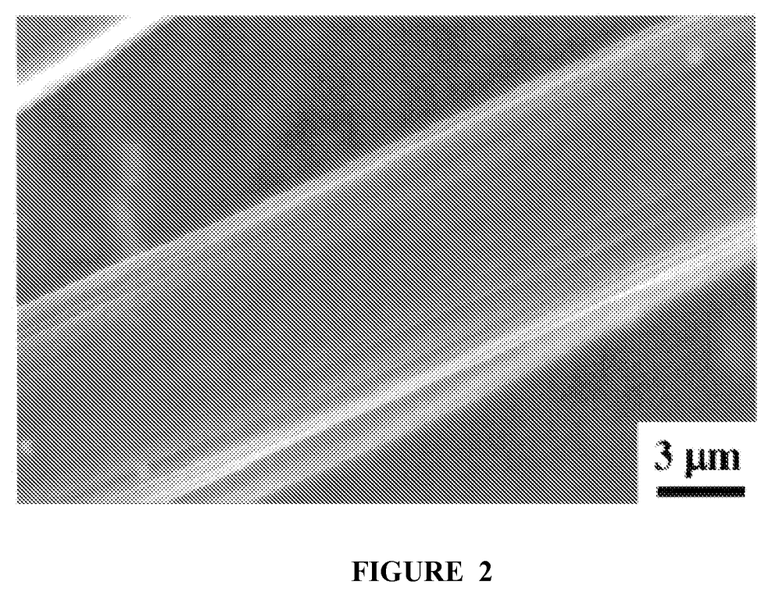
FIG. 2 provides an SEM image of a single carbon fiber in accordance with exemplary embodiments of the present invention.
Figure 3:
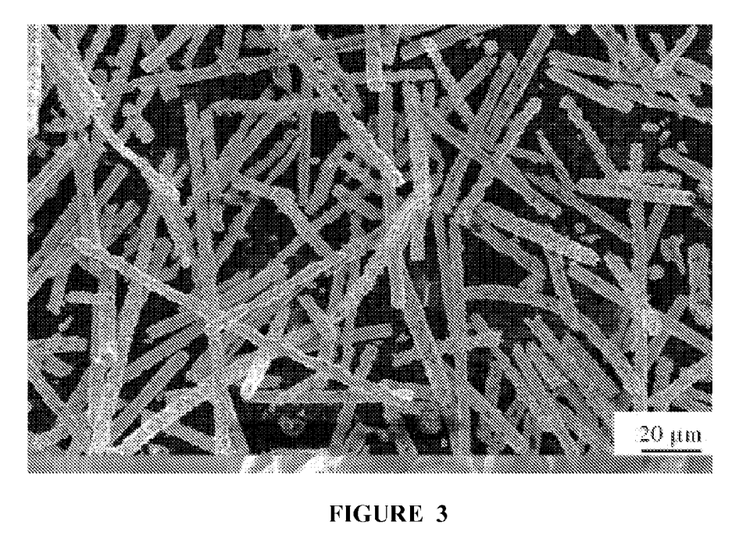
FIG. 3 provides an SEM image of tungsten-coated carbon fiber templates in accordance with exemplary embodiments of the present invention.
Figure 4:
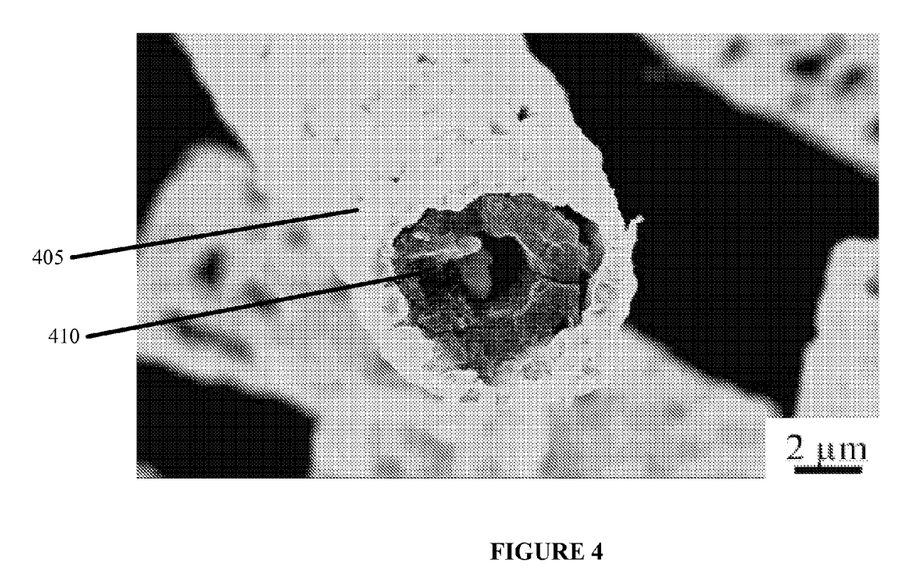
FIG. 4 provides an SEM image of a tungsten coating over a single carbon fiber template in accordance with exemplary embodiments of the present invention.
Figure 5:
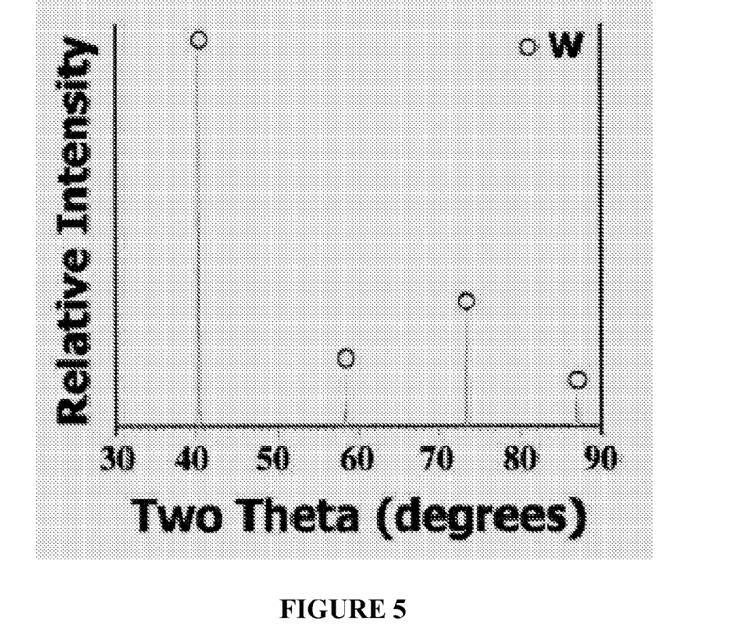
FIG. 5 is an X-ray diffraction (XRD) pattern of the tungsten-coated carbon fibers illustrated in FIGS. 3 and 4 in accordance with exemplary embodiments of the present invention.
Figure 6:
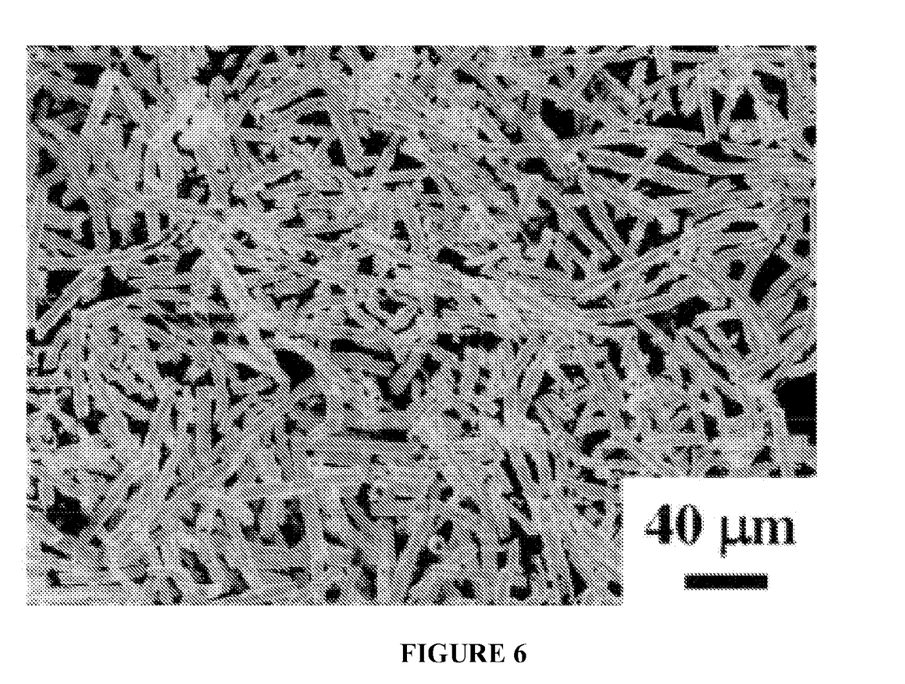
FIG. 6 provides an SEM image of tungsten- and tungsten carbide-coated carbon fiber templates in accordance with exemplary embodiments of the present invention.

The machinability and chemical properties of carbon make it a desirable element to use as a shaped template that reacts with a metal oxyhalide fluid to create a metal or metal carbide replica of the shaped template. As such, replicas of many different shapes, thicknesses, and sizes can be produced. Further, carbon selectively reacts with oxygen, which drives the reaction to produce a metal or metal carbide replica that is substantially pure. Many different carbon templates can be used. For example, carbon fibers, such as those illustrated in FIGS. 1 and 2 can be used as templates. The carbon fibers illustrated in the scanning electron microscope (SEM) images of FIGS. 1 and 2 are of 99.5% purity, have an average diameter of approximately 7.2 micrometers (μm), and have an average length of 150 μm. FIGS. 3 and 4 illustrate the product of a reaction between $WO_2Cl_2(g)$, generated from the reaction between $CaCl_2$ and $WO_3$, and the carbon fibers illustrated in FIGS. 1 and 2 at a temperature of approximately 900° C. for a time period of approximately 24 hours. In this particular reaction, the tungsten oxyhalide vapor reacts on the outer surface of the carbon fiber. This reaction produces a dense tungsten layer 405. Carbon then diffuses outward through the tungsten layer 405 and continues to react with the tungsten oxyhalide vapor at the outer surface. Because of this outward carbon diffusion, an interior cavity 410 defined within the center of the fiber develops, as illustrated in FIG. 4. FIG. 5 provides an X-ray diffraction (XRD) pattern of the tungsten coating. In some embodiments, the product illustrated in FIG. 4 can be further heated at high temperatures, for example 1800° C., for an additional time period of approximately 2 hours to produce a replica comprising both tungsten and tungsten carbide, as illustrated in FIG. 6.

Figure 7:
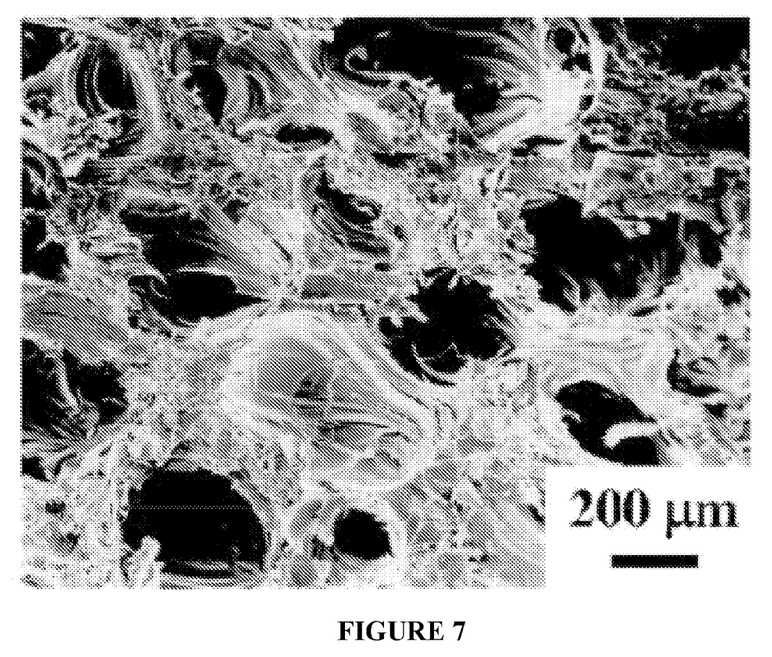
FIG. 7 provides an SEM image of graphitic carbon foam in accordance with exemplary embodiments of the present invention.
Figure 8:
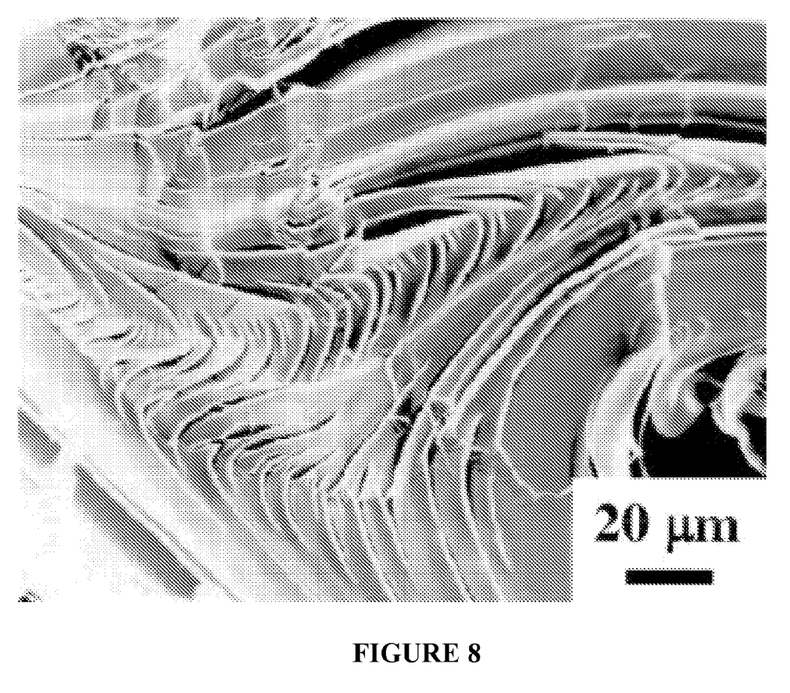
FIG. 8 provides another SEM image of graphitic carbon foam in accordance with exemplary embodiments of the present invention.
Figure 9:
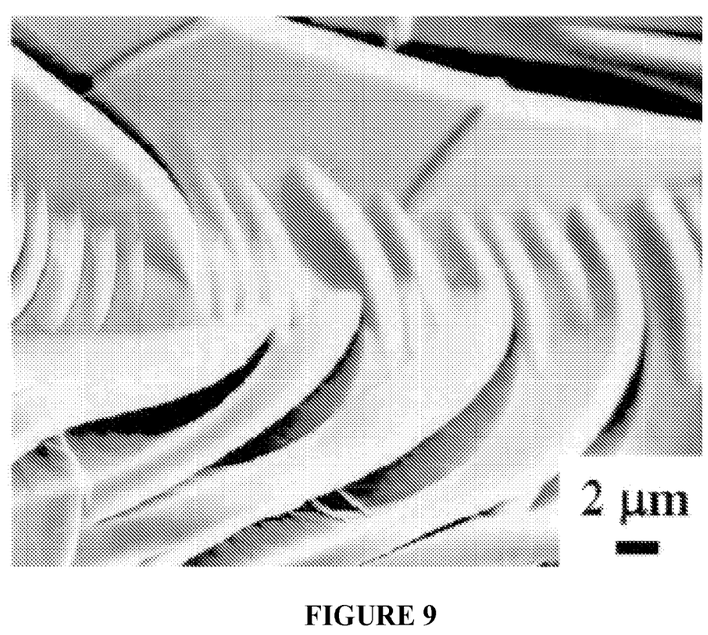
FIG. 9 provides yet another SEM image of graphitic carbon foam in accordance with exemplary embodiments of the present invention.
Figure 10:
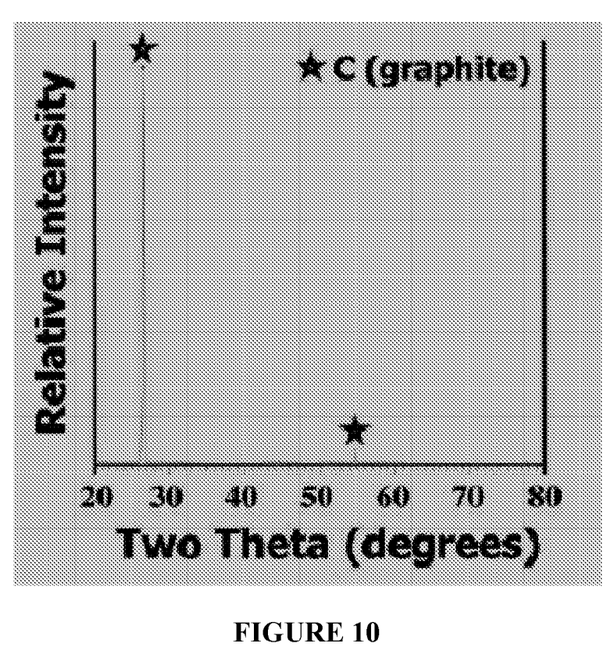
FIG. 10 is an XRD pattern of the graphitic carbon in FIGS. 9-11 in accordance with exemplary embodiments of the present invention.
Figure 11:
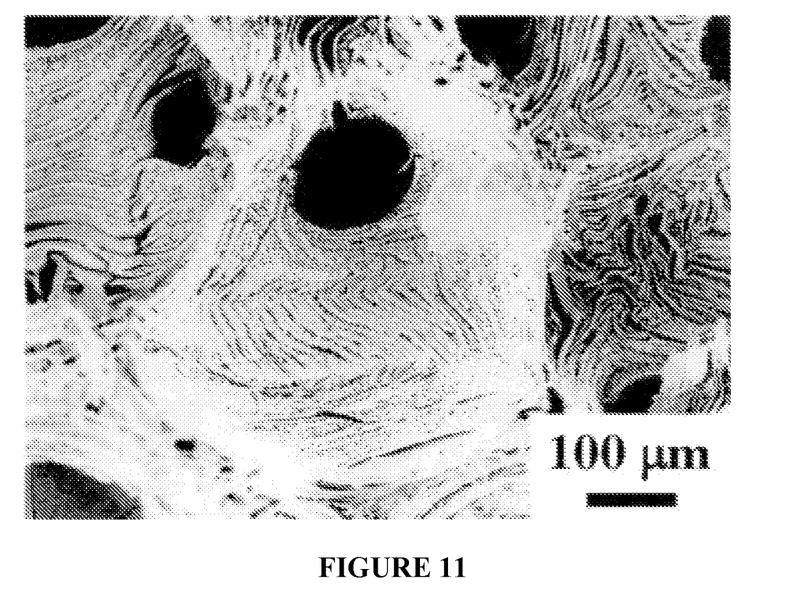
FIG. 11 provides an SEM image of a tungsten replica of graphitic carbon foam in accordance with exemplary embodiments of the present invention.
Figure 12:
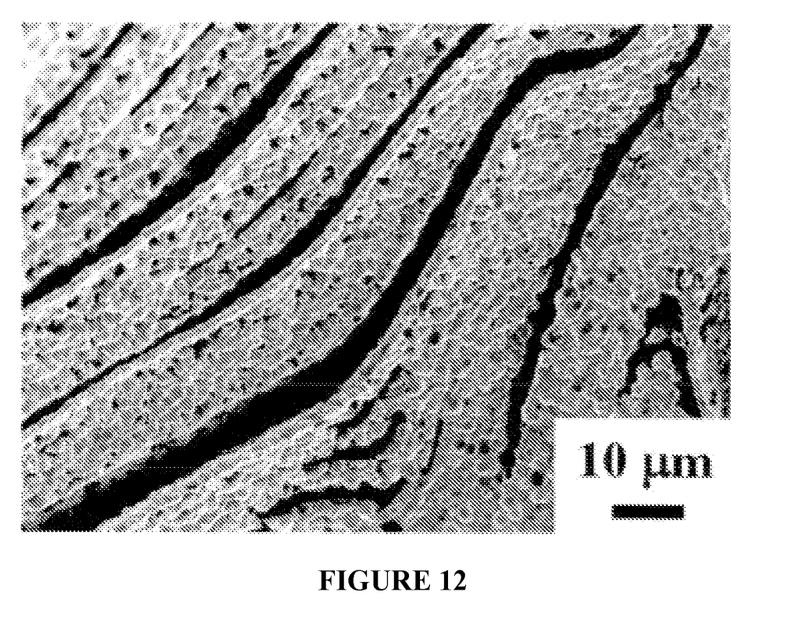
FIG. 12 provides another SEM image of a tungsten replica of graphitic carbon foam in accordance with exemplary embodiments of the present invention.
Figure 13:
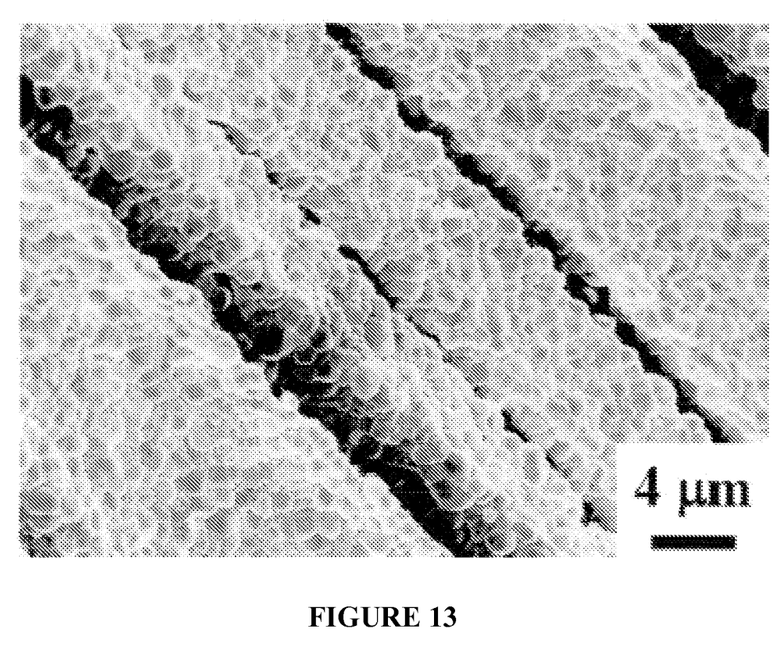
FIG. 13 provides yet another SEM image of a tungsten replica of graphitic carbon foam in accordance with exemplary embodiments of the present invention.
Figure 14:
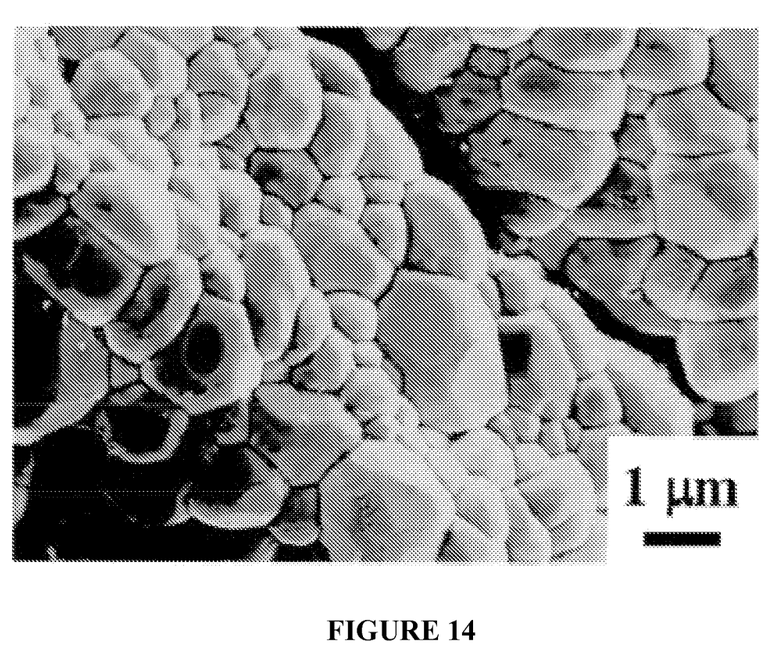
FIG. 14 provides another SEM image of a tungsten replica of graphitic carbon foam in accordance with exemplary embodiments of the present invention.
Figure 15:
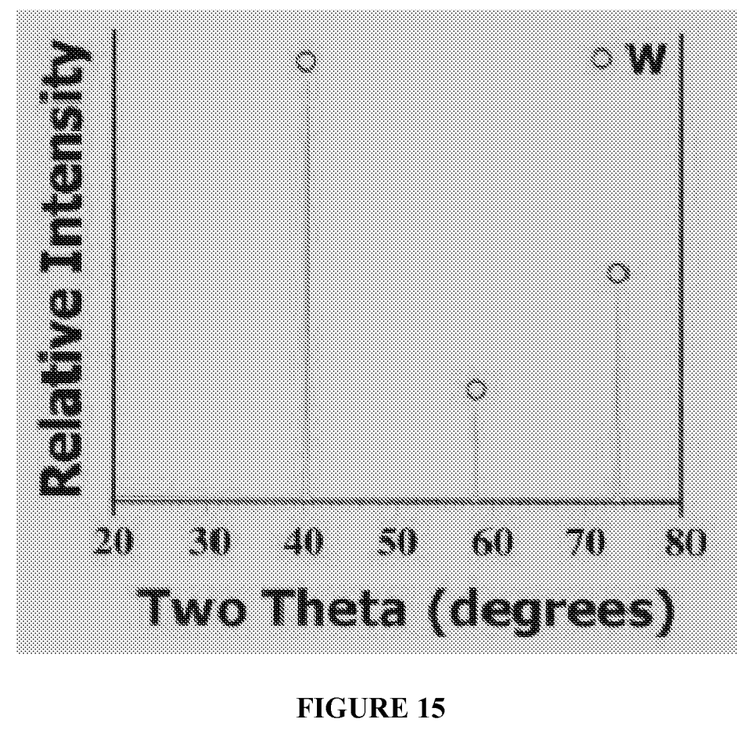
FIG. 15 is an XRD pattern of tungsten in the tungsten replica in FIGS. 13-16 in accordance with exemplary embodiments of the present invention.
Figure 16:
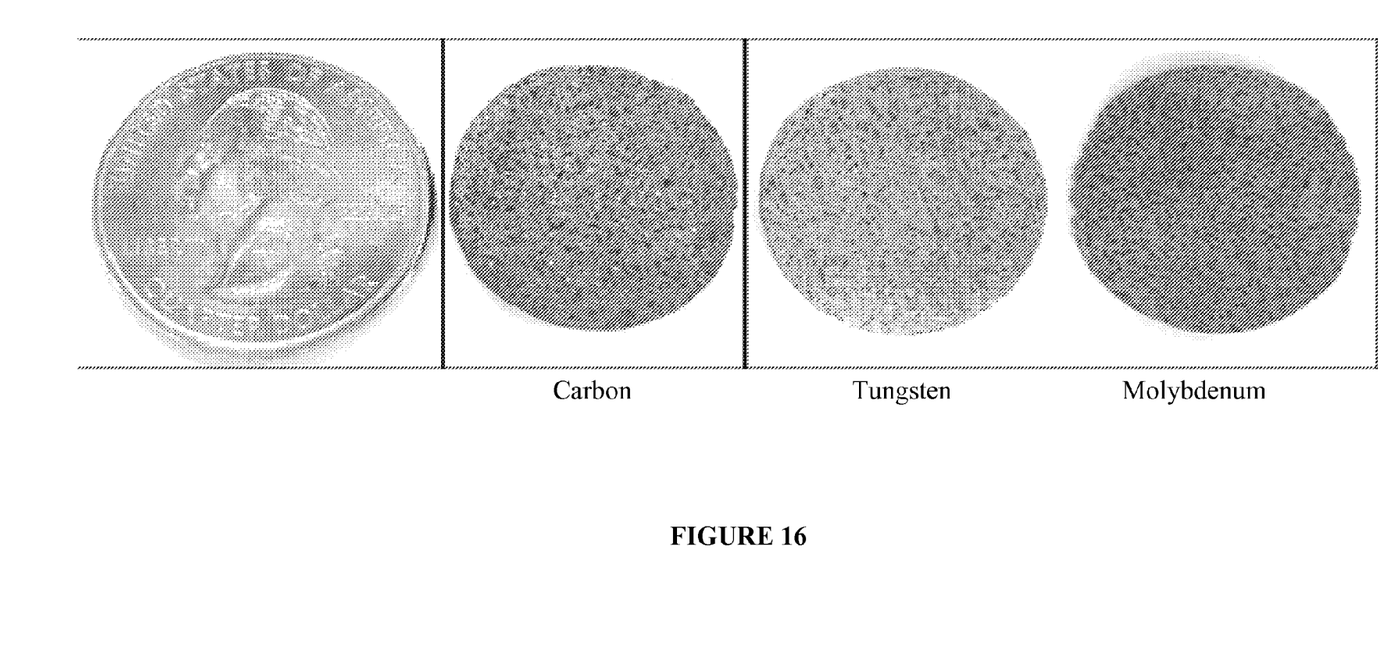
FIG. 16 illustrates the morphology preservation of a carbon template upon conversion into tungsten and molybdenum replicas.

Graphitic carbon foam can also be used as a template. FIGS. 7 through 9 illustrate an example of graphitic carbon foam having approximately 61% total porosity, with 95% of the pore volume being open, and a 350 μm average pore diameter (or average longest cross-sectional dimension). Like the reaction described above with carbon fibers, $WO_2Cl_2$ (g), generated from the reaction between $CaCl_2$ and $WO_3$, can react with graphitic carbon foam at a temperature of approximately 1100° C. for a time period of approximately 4 hours. FIGS. 11 through 14 provide various magnified images of this complete carbon conversion. As illustrated in FIGS. 11 through 14, the tungsten takes on the shape of the graphitic carbon foam. The XRD pattern of FIG. 15 shows the complete conversion of this graphitic carbon foam as the graphitic carbon peak of FIG. 10, is no longer apparent. FIG. 16 further illustrates the morphology preservation of the carbon template during its reaction with a metal oxyhalide fluid. As illustrated in FIG. 16, the replica takes on a substantially identical geometry as that of the carbon template.

In other exemplary embodiments, at least two metal oxyhalide fluids can react alternatingly and sequentially with a carbon template to create a multilayered metal, a metal carbide, or a combination thereof replica of the template. The multilayered replica can then be heated to create a metal-containing alloy replica. It shall be understood that metal-containing alloy means a mixture or a solid solution of two or more metal-containing components. In an alternative embodiment, at least two metal oxyhalide fluids can react simultaneously with a carbon template to create a metal-containing alloy and/or a ceramic replica of the template. These reactions are also self-limiting in that they do not require any external reducing agents (that is, a reducing agent in addition to the shaped template) to assist in facilitating the reaction.

It should be understood that the various carbon templates, reactants, reaction temperatures, and reacting times described above are exemplary embodiments of the present invention. Accordingly, the embodiments of the reaction should not be limited to those parameters. Further, as stated above, the reactions can be manipulated to either partially or fully convert the carbon template. Such manipulation can be carried out by changing the parameters of the reaction, such as the period of time and/or temperature of the reaction.

EXAMPLES

The various embodiments of the present invention are illustrated by the following non-limiting examples.

Example 1

As an example of the process of the present invention and materials produced thereby, the following reaction between calcium chloride $CaCl_2$ and tungsten oxide $WO_3$ was employed to generate tungsten dioxide dichloride $WO_2Cl_2$ (g):

$$CaCl_2 + 2WO_3 \rightarrow CaWO_4 + WO_2Cl_2(g) \quad (1)$$

which represented the most favorable product by several orders of magnitude, as demonstrated in Table I (note: $\Delta G^0_{rxn}$ refers to the standard Gibbs free energy change of reaction for reactions for which the condensed phases are assumed to be pure and in their stable forms):

| Reaction | $\Delta G^0_{rxn}$ @ 800° C. (kJ per mol) |
|---|---|
| $CaCl_2 + 2\,WO_3 \rightarrow CaWO_4 + WO_2Cl_2(g)$ | −58.865 |
| $1.5\,CaCl_2 + 2.5\,WO_3 \rightarrow 1.5\,CaWO_4 + WOCl_3(g) + 0.25\,O_2(g)$ | 14.515 |
| $2\,CaCl_2 + 3\,WO_3 \rightarrow 2\,CaWO_4 + WOCl_4(g)$ | 75.538 |
| $3\,CaCl_2 + 4\,WO_3 \rightarrow 3\,CaWO_4 + WCl_6(g)$ | 163.381 |
| $2\,CaCl_2 + 3\,WO_3 \rightarrow 2\,CaWO_4 + WCl_4(g) + 0.5\,O_2(g)$ | 199.611 |
| $0.5\,CaCl_2 + 1.5\,WO_3 \rightarrow 0.5\,CaWO_4 + WO_2Cl(g) + 0.25\,O_2(g)$ | 299.153 |
| $CaCl_2 + 2\,WO_3 \rightarrow CaWO_4 + WOCl_2(g) + 0.5\,O_2(g)$ | 299.390 |
| $CaCl_2 + 2\,WO_3 \rightarrow CaWO_4 + WCl_2(g) + O_2(g)$ | 430.287 |
| $0.5\,CaCl_2 + 1.5\,WO_3 \rightarrow 0.5\,CaWO_4 + WOCl(g) + 0.75\,O_2(g)$ | 582.102 |

This reactant species was then reacted with carbon, C, to form tungsten monoxide trichloride, $WOCl_3(g)$, and carbon monoxide, $CO(g)$, to form tungsten, W, and/or tungsten carbide, WC:

$$4C + 3WO_2Cl_2(g) = W + 2WOCl_3(g) + 4CO(g) \quad (2a)$$

$$5C + 3WO_2Cl_2(g) = WC + 2WOCl_3(g) + 4CO(g) \quad (2b)$$

which represented the most thermodynamically favorable reactions, as demonstrated in (Table II):

TABLE II

| Reaction | $\Delta G^0_{rxn}$ @ 1100° C. (kJ per mole $WO_2Cl_2(g)$ reacted) |
|---|---|
| $4C + 3WO_2Cl_2(g) \rightarrow W + 2WOCl_3(g) + 4CO(g)$ | −64.859 |
| $4C + 2WO_2Cl_2(g) \rightarrow W + WCl_4(g) + 4CO(g)$ | −39.650 |
| $2C + WO_2Cl_2(g) \rightarrow WCl_2(g) + 2CO(g)$ | −22.381 |
| $10C + 5WO_2Cl_2(g) \rightarrow 3W + 2WCl_5(g) + 10CO(g)$ | −5.108 |
| $6C + 3WO_2Cl_2(g) \rightarrow 2W + WCl_6(g) + 6CO(g)$ | 21.710 |
| $3C + 2WO_2Cl_2(g) \rightarrow W + WOCl_4(g) + 3CO(g)$ | 30.310 |
| $C + WO_2Cl_2(g) \rightarrow WOCl_2(g) + CO(g)$ | 101.034 |

The thermodynamics of the reactions to form WC can be represented by the summation of the above reactions and the reaction $W + C = WC$, and thus a similar trend is expected for the relative stability of $WO_yCl_z(g)$ product species.

The rate of reaction (1) was observed to be slow while both $CaCl_2$ and $WO_3$ were solids; however, upon melting of $CaCl_2$ (e.g., about 775° C.) the reaction proceeded at a measurable rate, which is thought to depend on the particle size of the $WO_3$ reactant and the reaction temperature. In a typical experiment, about 8.0 grams (g) $CaCl_2$ and about 48.3 g $WO_3$ (representing approximately 50 percent (%) molar excess of $WO_3$ for the predicted reaction (1) stoichiometry) powders were blended and placed inside a fused silica crucible. Upon heating to temperatures between approximately 775° C. to approximately 1100° C. for times between approximately 4 and 8 hours, a maximum weight loss of $20.0 \pm 0.5$ g was measured, in good agreement with the theoretical yield of reaction (1). The generated vapors were passed down a fused silica tube with an argon carrier gas flowing with a velocity between approximately 0.03 centimeters per second (cm/s) and 0.85 cm/s over the carbon template which was held at approximately 1100° C. atop a quartz frit insert.

According to the reaction stoichiometry of (2a), a carbon template fully converted into tungsten would undergo a solid volume change going from approximately 4 moles of carbon (5.302 cubic centimeters per mole ($cm^3$/mol)) to approximately 1 mole of tungsten (9.546 $cm^3$/mol), corresponding to a solid volume decrease of approximately 55.0%. The changes in the bulk densities of carbon templates (e.g., graphitic foam starting at approximately 0.37 grams per cubic centimeter (g/$cm^3$) and pressed graphite starting at approximately 1.82 g/$cm^3$) fully converted to tungsten replicas (e.g., replicas having bulk densities of approximately 1.20 g/$cm^3$ and approximately 6.92 g/$cm^3$ corresponding to converted graphitic foam and converted pressed graphite templates, respectively) having minimally detectable changes in external dimensions (e.g., less than approximately 1.5% in linear dimension) are in reasonable agreement with this expected change in solid volume. This highlights the wide range of product densities achievable in porous metal and/or metal carbide replicas: the density of the tungsten replica is determined both by the density of the carbon template and the stoichiometry of reaction(s) (2a,b).

Example 2

In this example, $MoO_2Cl_2(g)$ was generated via a reaction of $CaCl_2$ with $MoO_3$ and was reacted with C to form Mo/MoC replicas and/or coatings.

$$CaCl_2 + 2MoO_3 = CaMoO_4 + MoO_2Cl_2(g)$$

$$4C + 3MoO_2Cl_2(g) = Mo + 2MoOCl_3(g) + 4CO(g)$$

$$5C + 3MoO_2Cl_2(g) = MoC + 2MoOCl_3(g) + 4CO(g)$$

Example 3

In this example, NbOCl$_3$(g) was generated via a reaction of CaCl$_2$ with Nb$_2$O$_5$ and was reacted with C to form Nb/NbC replicas and/or coatings.

$$3CaCl_2+4Nb_2O_5=3CaNb_2O_6+2NbOCl_3(g)$$

$$4C+4NbOCl_3(g)=Nb+3NbCl_4(g)+4CO(g)$$

$$5C+4NbOCl_3(g)=NbC+3NbCl_4(g)+4CO(g)$$

Example 4

In this example, TaOCl$_3$(g) was generated via a reaction of CaCl$_2$ with Ta$_2$O$_5$ and was reacted with C to form Ta/TaC replicas and/or coatings.

$$3CaCl_2+4Ta_2O_5=3CaTa_2O_6+2TaOCl_3(g)$$

$$4C+4TaOCl_3(g)=Ta+3TaCl_4(g)+4CO(g)$$

$$5C+4TaOCl_3(g)=TaC+3TaCl_4(g)+4CO(g)$$

Example 5

In this example, both TaOCl$_3$(g) and WO$_2$Cl$_2$(g) were generated via a reaction of CaCl$_2$ with WO$_3$ and Ta$_2$O$_5$ and were reacted with C to form W and TaC replicas and/or coatings.

$$4CaCl_2+2WO_3+4Ta_2O_5=3CaTa_2O_6+2TaOCl_3(g)+CaWO_4+WO_2Cl_2(g)$$

$$9C+4TaOCl_3(g)+3WO_2Cl_2(g)=W+TaC+8CO(g)+3TaCl_4(g)+2WOCl_3(g)$$

Example 6

In this example, both WO$_2$Cl$_2$(g) and MoO$_2$Cl$_2$(g) were generated via a reaction of CaCl$_2$ with WO$_3$ and MoO$_3$ and were reacted with C to form W and Mo replicas and/or coatings.

$$2CaCl_2+2WO_3+2MoO_3=CaWO_4+CaMoO_4+WO_2Cl_2(g)+MoO_2Cl_2(g)$$

$$8C+3WO_2Cl_2(g)+3MoO_2Cl_2(g)=(W,Mo)+8CO(g)+2WOCl_3(g)+2MoOCl_3(g)$$

Example 7

In this example, TaOCl$_3$(g) was generated via a reaction of CaCl$_2$ with Ta$_2$O$_5$ and then partially reacted with C to form a mixture of TaC with unreacted C.

$$3CaCl_2+4Ta_2O_5=3CaTa_2O_6+2TaOCl_3(g)$$

$$(4C+)5C+4TaOCl_3(g)=4CO(g)+3TaCl_4(g)+TaC(+4C)$$

WO$_2$Cl$_2$(g) was then generated, via a reaction of CaCl$_2$ with WO$_3$, and then reacted with the unreacted C to form a mixture of W and TaC.

$$CaCl_2+2WO_3=CaWO_4+WO_2Cl_2(g)$$

$$(TaC+)4C+3WO_2Cl_2(g)=4CO(g)+2WOCl_3(g)+W(+TaC)$$

Example 8

In this example, WO$_2$Cl$_2$(g) was first generated, via a reaction of CaCl$_2$ with WO$_3$, and partially reacted with C to form a mixture of W with unreacted C.

$$CaCl_2+2WO_3=CaWO_4+WO_2Cl_2(g)$$

$$4C+3WO_2Cl_2(g)=W+4CO(g)+2WOCl_3(g)$$

MoO$_2$Cl$_2$(g) was then generated, via a reaction of CaCl$_2$ with MoO$_3$, and then reacted with unreacted C to form a mixture of W and Mo.

$$CaCl_2+2MoO_3=CaMoO_4+MoO_2Cl_2(g)$$

$$(W+)4C+3MoO_2Cl_2(g)=4CO(g)+2MoOCl_3(g)+Mo(+W)$$

The molybdenum and tungsten were then annealed to form a molybdenum-tungsten solid solution.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims

What is claimed is:

1. A method of manufacturing of a shaped metal-containing component, the method comprising:
   reacting a metal oxyhalide fluid with a shaped template to form a shaped metal-containing component, wherein no reducing agent other than the shaped template is used to facilitate the reaction.

2. The method of claim 1, wherein the metal oxyhalide fluid is a vapor.

3. The method of claim 1, further comprising reacting a metal halide salt with a first metal oxide to form a second metal oxide and the metal oxyhalide fluid.

4. The method of claim 3, wherein the metal oxyhalide fluid is formed according to the following formula:

$$(v/q)RX_q+(1+v/a)MO_y=(v/a)R_{a/q}MO_{1+y}+MO_uX_v;$$

wherein a=v/(y−u), RX$_q$ is the metal halide salt, MO$_y$ is the first metal oxide, R$_{a/q}$MO$_{1+y}$ is the second metal oxide, and MO$_u$X$_v$ is the metal oxyhalide fluid.

5. The method of claim 3, wherein the metal halide salt comprises alkaline metal halide salts, alkali metal halide salts, transition metal halide salts, or combinations thereof.

6. The method of claim 3, wherein the first metal oxide is a transition metal oxide.

7. The method of claim 6, wherein a transition metal in the transition metal oxide comprises tungsten, molybdenum, niobium, tantalum, or combinations thereof.

8. The method of claim 1, wherein a metal in the metal oxyhalide fluid comprises tungsten, molybdenum, niobium, tantalum, or combinations thereof.

9. The method of claim 1, wherein a halogen in the metal oxyhalide fluid comprises fluorine, chlorine, or combinations thereof.

10. The method of claim 1, wherein the shaped template is a shaped carbon template.

11. The method of claim 10, wherein the shaped carbon template is a carbon fiber.

12. The method of claim 1, wherein the shaped template is a shaped boron template.

13. The method of claim 1, wherein the shaped metal-containing component comprises a shaped metal.

14. The method of claim 1, wherein the shaped metal-containing component comprises a shaped metal carbide.

15. The method of claim 1, wherein the shaped metal-containing component comprises a shaped metal boride.

16. The method of claim 1, further comprising at least partially reacting the shaped template.

17. The method of claim 1, wherein the shaped metal-containing component is a replica of the shaped template.

18. The method of claim 17, wherein the replica is substantially identical in configuration to the shaped template.

19. The method of claim 1, wherein the shaped metal-containing component is a coating disposed over the shaped template.

20. The method of claim 1, wherein the shaped metal-containing component is formed according to the following formula:

$$bC+MO_uX_v=(1-d)M+dMO_yX_z+bCO_r;$$

wherein C is a shaped carbon template, $MO_uX_v$ and $MO_yX_z$ are metal oxyhalide fluids, M is the shaped metal-containing component, $CO_r$ is a carbon oxide, v=dz, and u=dy+br.

21. The method of claim 1, wherein the shaped metal-containing component is formed according to the following formula:

$$(b+s(1-d))C+MO_uX_v=(1-d)MC_s+dMO_yX_z+bCO_r$$

wherein C is a shaped carbon template, $MO_uX_v$ and $MO_yX_z$ are metal oxyhalide fluids, MC is the shaped metal-containing component, $CO_r$ is a carbon oxide, v=dz, and u=dy+br.

22. A method of manufacturing a shaped metal-containing component, the method comprising:
reacting a first metal oxyhalide fluid and a second metal oxyhalide fluid alternatingly and sequentially or simultaneously with a shaped template to form a shaped metal-containing component, wherein no reducing agent other than the shaped template is used to facilitate the reaction.

23. The method of claim 22, wherein the first metal oxyhalide fluid and/or second metal oxyhalide fluid is a vapor.

24. The method of claim 22, wherein the shaped metal-containing component comprises a ceramic component.

25. The method of claim 24, wherein the ceramic component comprises a metal boride.

26. A method of manufacturing a shaped metal-containing component, the method comprising:
reacting at least two metal oxyhalide fluids with a shaped template to form a shaped metal-containing component comprising metal alloy and ceramic components, wherein no reducing agent other than the shaped template is used to facilitate the reaction.

27. The method of claim 26, wherein the first metal oxyhalide fluid and/or the second metal oxyhalide fluid is a vapor.

28. The method of claim 26, wherein the ceramic component comprises a metal carbide.

29. The method of claim 26, wherein the ceramic component comprises a metal boride.

30. The method of claim 24, wherein the ceramic component comprises a metal carbide.

* * * * *